(12) United States Patent
Hoshino et al.

(10) Patent No.: US 8,609,796 B2
(45) Date of Patent: Dec. 17, 2013

(54) METHOD FOR CHEMICALLY PRODUCING POLY(N-ALKYLCARBAZOLE) COLUMNAR STRUCTURE

(75) Inventors: Katsuyoshi Hoshino, Chiba (JP); Takuya Tokuda, Chiba (JP); Katsuyuki Murashiro, Chiba (JP); Toshiki Komatsu, Chiba (JP)

(73) Assignees: National University Corporation Chiba University, Chiba (JP); JNC Corporation, Tokyo (JP)

( * ) Notice: Subject to any disclaimer, the term of this patent is extended or adjusted under 35 U.S.C. 154(b) by 0 days.

(21) Appl. No.: 13/517,616

(22) Filed: Jun. 14, 2012

(65) Prior Publication Data

US 2012/0322963 A1 Dec. 20, 2012

(30) Foreign Application Priority Data

Jun. 15, 2011 (JP) ................................. 2011-133060

(51) Int. Cl.
*C08F 26/06* (2006.01)

(52) U.S. Cl.
USPC .......................................... 526/259; 526/172

(58) Field of Classification Search
USPC ................................................. 526/259, 172
See application file for complete search history.

(56) References Cited

U.S. PATENT DOCUMENTS

2011/0017958 A1* 1/2011 Hoshino et al. ............... 252/512

FOREIGN PATENT DOCUMENTS

| JP | 2007-009049 | 1/2007 |
| JP | 2008-239835 | 10/2008 |
| JP | 2010-257797 | 11/2010 |

* cited by examiner

*Primary Examiner* — Shane Fang
(74) *Attorney, Agent, or Firm* — Jianq Chyun IP Office

(57) ABSTRACT

A novel nanosized or microsized material having electroconductivity that can be produced simply and in a large amount is provided. A method for producing a poly(N-alkylcarbazole) columnar structure having electroconductivity obtained by chemically polymerizing N-alkylcarbazole including alkyl having 1 to 4 carbons by adding an oxidizing agent to a solution obtained by dissolving the N-alkylcarbazole in a solvent is provided.

6 Claims, 8 Drawing Sheets

US 8,609,796 B2

METHOD FOR CHEMICALLY PRODUCING POLY(N-ALKYLCARBAZOLE) COLUMNAR STRUCTURE

CROSS-REFERENCE TO RELATED APPLICATION

This application claims the priority benefit of Japan application serial no. 2011-133060, filed on Jun. 15, 2011. The entirety of the above-mentioned patent application is hereby incorporated by reference herein and made a part of this specification.

TECHNICAL FIELD

The present invention relates to a novel method for producing a resin structure having electroconductivity. More specifically, the invention relates to a method for chemically producing a poly(N-alkylcarbazole) columnar structure.

BACKGROUND ART

An electroconductive polymer such as polyaniline, polypyrrole and polythiophene is expected to be applied in various fields as a performance material because the polymer has properties such as redox properties (oxidation-reduction properties) or doping and dedoping properties. The materials are formed into a nanosized material to take advantage of electroconductivity thereof, and thus are expected to be utilized in various applications such as a field emission material to be used for a field emission device in a field emission display (FED), a wiring material, a sensor, an electrochemical capacitor, a probe for a prove microscope and a catalyst carrier.

As for a nanosized electroconductive polymer, such an art is known as a method for producing a nanosized electroconductive polymer of polypyrrole and polythiophene according to an electrochemical technique using a nanocylinder (see Patent literature No. 1, for example). However, the method is unsuitable for mass production due to use of a supercritical fluid or subcritical fluid as an electrolytic solvent to complicate equipment and increase cost. Moreover, in the case where the method is employed, the method has involved problems of complicating a process also from necessity of removing a template, and a further increase in cost due to only one-time use of the template.

A carbon nanotube or a metal nanowire has been found in recent years to take a growing interest in an electroconductive nanomaterial. A nanomaterial having an average diameter in the range of several nanometers to several hundred nanometers and an average length of approximately 1 micrometer or more has been used in an application such as an electroconductive material, an electron emission device and the template for the carbon nanotube. As a method for producing the nanomaterial of the electroconductive polymer, only a method using the nanocylinder or the template as also described in Patent literature No. 1 has been known so far.

On the other hand, carbazole is a heterocyclic compound represented by a molecular formula: $C_{12}H_9N$, and is a compound having electroconductivity. An art is known in which N-alkylcarbazole as a derivative of carbazole can be formed into a performance compound for LED by allowing N-alkylcarbazole to react with cellulose in a solvent (see Patent literature No. 2, for example).

Then, the inventors of the invention have succeeded in polymerization of N-alkylcarbazole, and have proposed that poly(N-alkylcarbazole) can be provided as a transparent membrane structure (see Patent literature No. 3).

CITATION LIST

Patent Literature

Patent literature No. 1: JP 2008-239835 A.
Patent literature No. 2: JP 2007-009049 A.
Patent literature No. 3: JP 2010-257797 A.

SUMMARY OF INVENTION

Technical Problem

In view of the demand as described above, this invention provides a method for producing a polymer nanomaterial, in which the polymer nanomaterial can be produced chemically, simply and in a large amount.

Solution to Problem

The inventors of the invention have invented a membrane organic transparent conductor based on a finding that poly(N-alkylcarbazole) is dissolved in an organic solvent (Patent literature No. 3). According to the technology, a membrane has been prepared by paying attention to properties of poly(N-alkylcarbazole) as a transparent conductor. The inventors have proceeded with a further investigation on the material, as a result, have found that a poly(N-alkylcarbazole) columnar structure having electroconductivity is obtained by chemically polymerizing N-alkylcarbazole including an alkyl chain having 1 to 4 carbons, among types of N-alkylcarbazole, in a solvent, and thus have completed the invention.

The invention includes the constitutions described below.

Item 1. A method for producing a poly(N-alkylcarbazole) columnar structure, comprising a polymerization process for polymerizing N-alkylcarbazole including alkyl having. 1 to 4 carbons by adding an oxidizing agent to a solution obtained by dissolving the N-alkylcarbazole in a solvent.

Item 2. The method for producing the poly(N-alkylcarbazole) columnar structure according to item 1, wherein a dielectric constant of the solvent to be used in the polymerization process is 30 or more.

Item 3. The method for producing the poly(N-alkylcarbazole) columnar structure according to item 1 or 2, wherein the solvent to be used in the polymerization process is methyl alcohol or acetonitrile, or a mixed solvent of methyl alcohol and acetonitrile.

Item 4. The method for producing the poly(N-alkylcarbazole) columnar structure according to any one of items 1 to 3, wherein the oxidizing agent to be added in the polymerization process is iron (III) perchlorate.

Item 5. The method for producing the poly(N-alkylcarbazole) columnar structure according to any one of items 1 to 4, wherein the N-alkylcarbazole is N-methylcarbazole or N-ethylcarbazole.

Advantageous Effects of Invention

A poly(N-alkylcarbazole) columnar structure obtained by a production method of the invention has electroconductivity, and is expected to be applied in various fields as a performance material. Moreover, the production method is simple, and therefore neither use of a special cylinder nor application of a high pressure is needed. Furthermore, the method also has an advantage of allowing production of a large amount of the columnar structure at a time, and has an excellent productivity.

The poly(N-alkylcarbazole) columnar structure of the invention can have an increased surface area because of a nanosized or micronized columnar structure. Efficiency of various reactions can be improved because the columnar structure of the invention has a large surface area. Therefore, the columnar structure is useful as (1) an electroconductive material for an electromagnetic wave absorber, (2) a wiring material for a cable, (3) a material for a secondary battery or capacitor, (4) a catalyst, (5) an antibacterial fiber, (6) a probe for a probe microscope, (7) an electron emission source or the like. The poly(N-alkylcarbazole) columnar structure includes the nanosized or microsized columnar structure, and thus is suitable for mixing with various materials.

DESCRIPTION OF EMBODIMENTS

Figure 1:
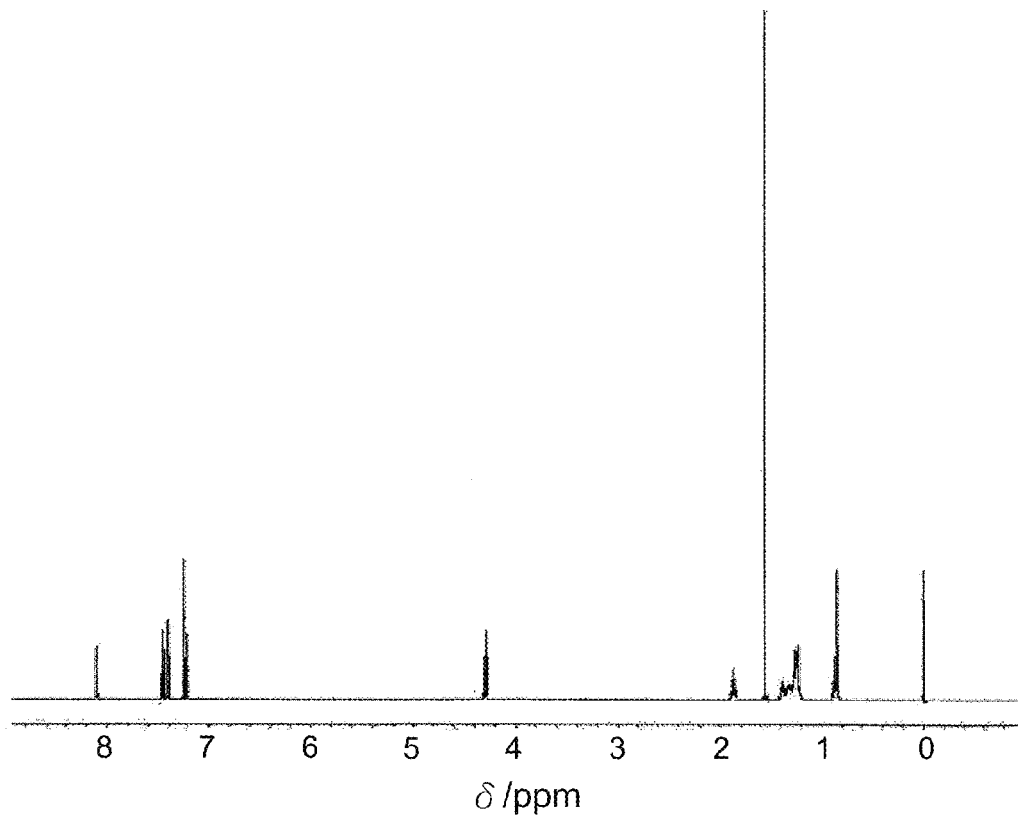
FIG. 1 is a diagram showing an NMR chart of N-n-octylcarbazole produced in Synthesis Example.

The invention concerns a method for producing a poly(N-alkylcarbazole) columnar structure including alkyl having 1 to 4 carbons. More specifically, the invention concerns a method for producing a poly(N-alkylcarbazole) columnar structure by chemically polymerizing N-alkylcarbazole including alkyl having 1 to 4 carbons by adding an oxidizing agent to a solution obtained by dissolving the N-alkylcarbazole in a solvent. "Poly(N-alkylcarbazole)" means an N-alkylcarbazole polymer having a polymerization degree of approximately 2 or more to be obtained by polymerizing at least one kind of N-alkylcarbazole represented by formula (1) described below.

Formula (1)

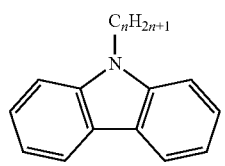
(1)

In the above formula, n is an integer from 1 to 4. Specific examples of alkyl ($C_nH_{2n+1}$) include methyl, ethyl, propyl, i-propyl, n-butyl, i-butyl and t-butyl. Upon producing the poly(N-alkylcarbazole) by chemical polymerization, in the case where the number of carbons of an alkyl chain of N-alkylcarbazole is large, the poly(N-alkylcarbazole) will result in a "ball" structure without resulting in the columnar structure. Therefore, alkyl of N-alkylcarbazole to be used in the invention has 1 to 4 carbons. In the case where alkyl is methyl or ethyl among types of alkyl, a surface area of the structure is increased by obtaining a clearer columnar structure, and therefore such a structure is preferred as a material.

Moreover, in the alkyl, one or a plurality of hydrogen may be replaced by at least one kind of a group selected from hydroxy, carboxyl, sulfo and amino. Furthermore, carbon bonded with N-position of carbazole is preferably primary carbon or secondary carbon.

The poly(N-alkylcarbazole) obtained according to the invention may be a homopolymer obtained by polymerizing one kind of N-alkylcarbazole, or a copolymer obtained by copolymerizing two or more kinds of N-alkylcarbazole. As the poly(N-alkylcarbazole), one kind of poly(N-alkylcarbazole) may be used alone, or two or more kinds of poly(N-alkylcarbazole) including alkyl each having the different number of carbons may be used in combination. The polymerization degree of the poly(N-alkylcarbazole) is preferably in the range of approximately 2 to approximately 1,000, further preferably, in the range of approximately 2 to approximately 100, particularly preferably, in the range of approximately 2 to approximately 22.

As explained previously, the poly(N-alkylcarbazole) has been already synthesized by the inventors of the invention. The poly(N-alkylcarbazole) according to Patent literature No. 3 has a membrane structure, and is different from the columnar structure of the invention.

The inventors of the invention have already applied a patent for a poly(N-alkylcarbazole) columnar structure to be obtained by electrolytic polymerization and a method for producing the same according to Japanese Patent Application No. 2010-56198. However, the invention is different from an earlier invention. The invention includes a process for chemically polymerizing N-alkylcarbazole using the oxidizing agent, in which the poly(N-alkylcarbazole) can be produced more simply and in a larger amount.

The poly(N-alkylcarbazole) columnar structure produced according to the invention has a feature of a nanosized or microsized columnar structure. In the invention, "columnar structure" means a cylindrical column and a polygonal column such as a triangular column and a quadrangular column as a concept for distinguishing the columnar structure from the membrane structure according to the earlier invention.

Moreover, even a hollow columnar structure is clearly covered by the columnar structure of the invention. In general, a shape expressed in terms of a tube, a wire or the like is covered by the columnar structure of the invention.

Accordingly as the structure of the invention can be expressed as the nanosized columnar structure, a minute structure can be produced. A diameter of the structure is in the range of approximately 0.1 to approximately 10 micrometers, preferably, in the range of approximately 0.3 to approximately 5 micrometers, further preferably, in the range of approximately 0.3 to approximately 1.7 micrometers. A length of the structure is not particularly limited, if the length is approximately 1 micrometer or more. In the invention, "diameter of the structure" means a diameter of the cylindrical column for the cylindrical column or a length of the longest diagonal line on a cross section of a rectangular column for the rectangular column. In the case where the structure is hollow, "diameter" means an outer diameter. In addition, a dimension of the structure of the invention can be measured by observation by means of an electron microscope.

In the case where the columnar structure of the invention is used as a nanosized material, the nanosized material is preferably used as an aggregate of the structure having an average diameter in the range of approximately 0.3 to 1 micrometer and an average length of approximately 1 micrometer or more.

The poly(N-alkylcarbazole) columnar structure of the invention can be confirmed by means of the electron microscope such as scanning electron microscope (SEM), and has a nanosize or microsize and a wire shape. Moreover, the columnar structure has electroconductivity, and is expected to be developed in various applications. Hereafter, the production method will be explained in detail.

Synthesis of N-alkylcarbazole

N-alkylcarbazole in which alkyl is bonded to N-position of carbazole can be prepared by a dehydrohalogenation reaction between carbazole and alkyl halide as an alkylating agent in the presence of a strongly basic alkali metal compound such as sodium hydride. Alternatively, N-alkylcarbazole can be prepared by a potassium halide elimination reaction between a carbazole potassium salt and alkyl halide. In addition thereto, commercially available N-alkylcarbazole may also be used. Alkyl of N-alkylcarbazole has 1 to 4 carbons. Specific examples include N-methylcarbazole, N-ethylcarbazole, N-propylcarbazole, N-isopropylcarbazole, N-butylcarbazole and N-isobutylcarbazole. Among types of N-alkylcarbazole, N-methylcarbazole and N-ethylcarbazole are preferred. Moreover, one or a plurality of hydrogen of alkyl may be replaced by at least one kind of a group selected from hydroxy, carboxyl, sulfo and amino.

Alkyl Halide

Alkyl halide as the alkylating agent is commercially available from a reagent manufacturer. In handling the agent in a laboratory, alkyl monobromide is easily handled in view of reactivity and abundance of types of alkyl. Specific examples of commercially available alkyl monobromide include 1-bromopropane, 2-bromopropane, 1-bromobutane, 2-bromobutane, 1-bromo-2-methylpropane and 2-bromo-2-methylpropane. The alkyl monobromide is commercially available from Tokyo Chemical Industry Co., Ltd., Sigma-Aldrich Japan K.K., Lancaster Synthesis, Inc. or the like.

Polymerization Process

A polymerization process in the invention includes a process for polymerizing N-alkylcarbazole by adding the oxidizing agent to the solution obtained by dissolving N-alkylcarbazole in the solvent.

First, N-alkylcarbazole prepared according to the above method or commercially available N-alkylcarbazole is dissolved in the solvent. On the occasion, a concentration of N-alkylcarbazole in the solvent is preferably in the range of approximately 0.002 to approximately 200 parts by weight, further preferably, in the range of approximately 0.02 to approximately 20 parts by weight, based on 100 parts by weight of the solvent. A polymerization reaction can be performed at a sufficient reaction rate by adjusting the concentration of N-alkylcarbazole in such a range.

The solvent is not particularly limited, if the solvent can dissolve N-alkylcarbazole, but the solvent having a dielectric constant of approximately 30 or more is preferred. The poly(N-alkylcarbazole) columnar structure is easily obtained by using the solvent having the dielectric constant of approximately 30 or more, and therefore such a solvent is preferred. Specific examples of the solvent having the dielectric constant of approximately 30 or more include alcohol, acetonitrile, propylene carbonate, nitromethane, dimethylformamide and hexamethylphosphamide.

Specific examples of the alcohol include methanol, ethanol and propanol. Among the solvents, methanol or acetonitrile is particularly preferred. The solvents may be used in combination. In the case of a mixed solvent, a mixed solvent of methanol and acetonitrile is preferred.

In the case where the solvent is used in the form of the mixed solvent of methanol and acetonitrile, a mixing ratio of methanol and acetonitrile is preferably in the range of approximately 1:10 to approximately 10:1, further preferably, in the range of approximately 1:5 to approximately 5:1, in a volume ratio.

As the oxidizing agent, $Fe(ClO_4)_3$, $CeSO_4$, $Ce(OH)_4$, $CeCl_4$, $Ce(NH_4)_2(NO_3)_6$, $K_2Cr_2O_3$, $FeCl_3$, $NaBrO_3$, $K_3[Fe(CN)_6]$, $KMnO_4$, $BF_3$, $H_2O_2$, $H_2SO_4$, $Br_2$, $I_2$, $Cl_2$, benzoquinone or the like is used. Among the oxidizing agents, a preferred oxidizing agent is iron(III) perchlorate represented by $Fe(ClO_4)_3$.

In adding the oxidizing agent to the solution in the polymerization process of the invention, N-alkylcarbazole is dissolved in the solvent to prepare an N-alkylcarbazole solution, and then the oxidizing agent may be directly added to the thus prepared N-alkylcarbazole solution, or each of N-alkylcarbazole and the oxidizing agent is dissolved in each solvent, and then both solutions may be mixed. In the case where each of N-alkylcarbazole and the oxidizing agent is dissolved in each solvent, and then the both solutions are mixed, each solution is subjected to stirring and simultaneously bubbling with nitrogen, and then the oxidizing agent solution is preferably added dropwise to the N-alkylcarbazole solution to allow polymerization while continuing stirring and bubbling.

As conditions for adding the oxidizing agent, in the case where the oxidizing agent is added dropwise in the form of the oxidizing agent solution, the oxidizing agent solution is preferably slowly added dropwise to the N-alkylcarbazole solution for uniformizing the dimension of the poly(N-alkylcarbazole) columnar structure. However, the poly(N-alkylcarbazole) columnar structure can be produced even by adding the oxidizing agent solution thereto as quickly as lighting (substantially approximately 0 seconds). The oxidizing agent solution is preferably added dropwise over approximately 10 seconds or more, further preferably, over approximately 50 seconds or more, still further preferably, over approximately 100 seconds or more. On the other hand, an upper limit is not particularly limited, but a period of time is preferably within approximately 1 hour, further preferably, within approximately 30 minutes, still further preferably, within approximately 15 minutes.

Polymerization of N-alkylcarbazole will start by addition of the oxidizing agent or dropwise addition of the oxidizing agent solution. In order to allow a sufficient polymerization, a period of time for allowing the resultant mixture to stand after dropwise addition is preferably approximately 30 minutes or more, further preferably, approximately 1 hour or more, still further preferably, approximately 24 hours or more. However, the poly(N-alkylcarbazole) columnar structure can be produced even if a dropwise addition period of time is short because a precipitate is confirmed in several seconds after starting addition of the oxidizing agent or dropwise addition of the oxidizing agent solution.

According to the polymerization process in the invention, polymerization can also be performed even in the case where air is dissolved in the solvent. However, bubbling with nitrogen is preferably performed to the solvent in order to reduce as much as possible an influence of oxygen in air dissolved in the solvent.

A temperature of the chemical polymerization in the invention is not necessarily limited, but is preferably in the range of approximately −40° C. or higher to approximately 70° C. or lower from a viewpoint of forming the poly(N-alkylcarbazole) columnar structure having a high electric conductivity. The temperature is further preferably in the range of approximately 0° C. or higher to approximately 60° C. or lower, particularly preferably, in the range of approximately 10° C. or higher to approximately 40° C. or lower from a viewpoint of increasing an amount of a formed columnar structure.

The poly(N-alkylcarbazole) obtained through the polymerization process of the invention is produced in the form of the precipitate in the solution. The poly(N-alkylcarbazole) columnar structure of the invention can be obtained through filtration and drying of the precipitate. No special method is needed for filtration and drying, and a publicly known method may be appropriately employed.

The dimension of the columnar structure obtained has a diameter in the range of approximately 0.1 to approximately 10 micrometers, and is clearly distinguished from membrane poly(N-alkylcarbazole). In the case where the columnar structure is used as the nanosized material, the diameter is preferably in the range of approximately 0.1 to approximately 5 micrometers, further preferably, in the range of approximately 0.1 to approximately 1.7 micrometers.

On the other hand, the length is not particularly limited, but is preferably approximately 1 micrometer or more. Moreover, an upper limit of the length does not particularly matter, but is preferably approximately 1 millimeter or less, further preferably, approximately 100 micrometers or less in view of easy handling as the material.

The poly(N-alkylcarbazole) columnar structure is preferably hollow because the surface area is further increased. In the above case, thickness of a tube wall is preferably approximately 1 nanometer or more.

The thus obtained poly(N-alkylcarbazole) columnar structure can be expected in various applications as a nanosized or microsized electroconductive material because the columnar structure has electroconductivity and can have an increased surface area.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

Hereinafter, a poly(N-alkylcarbazole) columnar structure was actually prepared based on the embodiment described above, and advantageous effects of the invention were confirmed. In the following, the invention will be explained by way of Examples, but the invention is in no way limited to the Examples.

Alkylating Agent

As an alkylating agent to be used for producing N-alkylcarbazole, alkyl monobromide was purchased from Tokyo Chemical Industry Co., Ltd., Sigma-Aldrich Corporation or Lancaster Synthesis, Inc.

Synthesis of N-alkylcarbazole

Carbazole was dissolved in a mixed solvent (tetrahydrofuran and N,N-dimethylformamide (3:1) (volume ratio)). Then, 1 equivalent of alkylating agent (alkyl bromide or alkyl iodide) obtained as described above was added to 1 equivalent of carbazole, a 60% by weight sodium hydride mineral oil dispersion (trade name "sodium hydride," made by Kanto Chemical Co., Inc.) corresponding to 1.5 equivalents of sodium hydride was gradually added while stirring, and stirring was carried out at room temperature for 1 hour. Thereto, methanol was added until no bubble was generated in order to stop the reaction, and then the solvent was removed by evaporation under reduced pressure. Dichloromethane was added to a residue, and washing was carried out with a 3 N hydrochloric acid solution and water. Anhydrous magnesium sulfate was added, and then drying and filtration were carried out. The solvent contained in the resultant filtrate was removed in vacuum, and purification of a residue was carried out by means of silica gel column chromatography using hexane for an eluent. In the following, a method for preparing N-alkylcarbazole in the case where commercially available N-alkylcarbazole is unavailable is shown by taking N-n-octylcarbazole as an example.

Synthesis Example of N-n-octylcarbazole

A specific synthetic method will be explained by taking a monomer (N-n-octylcarbazole) used for producing poly(N-n-octylcarbazole) as an example.

Carbazole (6.0 g, 0.036 mol, made by Tokyo Chemical Industry Co., Ltd.) was dissolved in a mixed solvent (tetrahydrofuran (30 mL) and N,N-dimethylformamide (10 mL)), 1-bromooctane (3.95 g, 0.036 mol, made by Tokyo Chemical Industry Co., Ltd.) was added thereto, and a 60% by weight sodium hydride mineral oil dispersion (trade name "sodium hydride," 2.16 g, 0.054 mol, made by Kanto Chemical Co., Inc.) was gradually added at room temperature (approximately 20° C.), and stirring was carried out for 1 hour to complete the reaction.

After completion of the reaction, methanol was poured into the resultant reaction mixture until no bubble was generated to stop the reaction. The solvent in the reaction mixture was removed with an evaporator, and then a concentrate was extracted with methylene chloride. An organic layer was washed with a 3 N hydrochloric acid solution and water, drying over magnesium sulfate was carried out, and then filtration was carried out. Methylene chloride in a filtrate was removed with an evaporator, and purification was carried out by means of silica gel column chromatography using hexane as an eluent. Hexane was removed with an evaporator, and thus a transparent liquid (8 g, yield of 80%) was obtained. The liquid could be confirmed to be N-n-octylcarbazole by means of $^1$H-NMR. Moreover, purity was confirmed to be 99.5% by means of high performance liquid chromatography (HPLC). An NMR chart is shown in FIG. 1.

In addition, N-methylcarbazole and N-ethylcarbazole used in Examples were purchased from Tokyo Chemical Industry Co., Ltd.

Method for Measuring a Diameter of a poly(N-alkylcarbazole) Columnar Structure

In a SEM micrograph, an arbitrary region including columnar structures in the range of 10 or more to 100 or less was set according to a dimension of a prepared poly(N-alkylcarbazole) columnar structure. Diameters of 10 points of poly(N-alkylcarbazole) columnar structures present in the region were measured, and the arithmetic average thereof was described as a diameter.

Example 1

Figure 2:
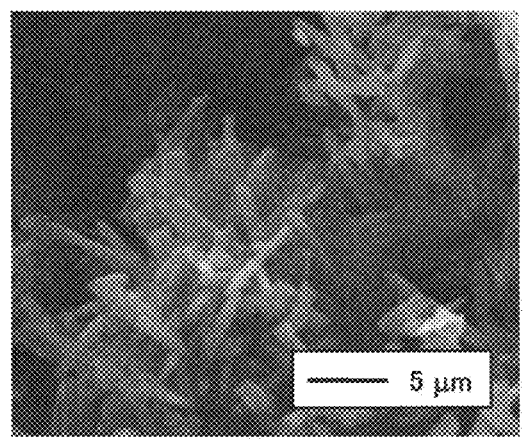
FIG. 2 is a micrograph showing a poly(N-methylcarbazole) columnar structure produced using an N-methylcarbazole 50 mM methanol solution and an iron (III) perchlorate 0.1 M methanol solution in Example 1.

N-methylcarbazole was added to 5 milliliters of methanol to be 50 mM and dissolved in the methanol. Moreover, iron (III) perchlorate was added to 5 milliliters of methanol to be 0.1 M and dissolved in the methanol. Bubbling with nitrogen was carried out for 20 minutes while stirring each solution, and then an iron(III) perchlorate 0.1 M methanol solution was added dropwise to an N-methylcarbazole 50 mM methanol solution at normal temperature (22° C.) over 630 seconds while continuing stirring and bubbling with nitrogen. A dark green precipitate was confirmed in several seconds after starting dropwise addition. After completion of the dropwise addition, the resultant mixture was allowed to stand for 24 hours, and then subjected to suction filtration using a glass filter to obtain the precipitate. A residue was dried at 40° C. for 1 hour using a dryer. A SEM micrograph of the residue obtained is shown in FIG. 2. An average diameter and an average length of a poly(N-methylcarbazole) columnar structure obtained from the SEM micrograph were 700 nanometers and 16 micrometers, respectively.

Example 2

Figure 3:
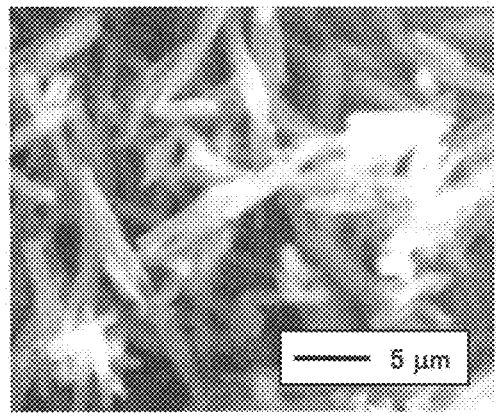
FIG. 3 is a micrograph showing a poly(N-methylcarbazole) columnar structure produced using an N-methylcarbazole 20 mM methanol solution and an iron (III) perchlorate 0.1 M methanol solution in Example 2.
Figure 4:
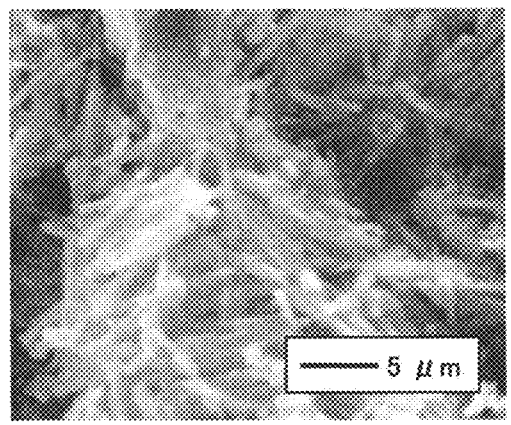
FIG. 4 is a micrograph showing a poly(N-methylcarbazole) columnar structure produced using an N-methylcarbazole 100 mM methanol solution and an iron (III) perchlorate 0.1 M methanol solution in Example 2.
Figure 5:
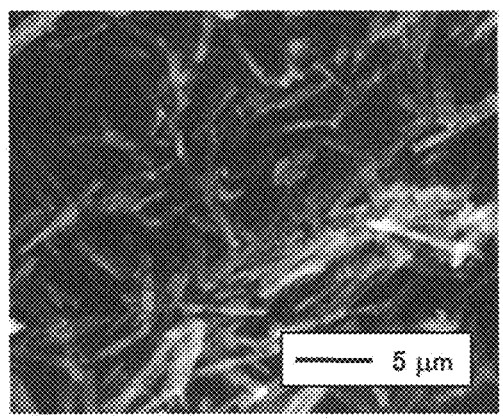
FIG. 5 is a micrograph showing a poly(N-methylcarbazole) columnar structure produced using an N-methylcarbazole 200 mM methanol solution and an iron (III) perchlorate 0.1 M methanol solution in Example 2.
Figure 6:
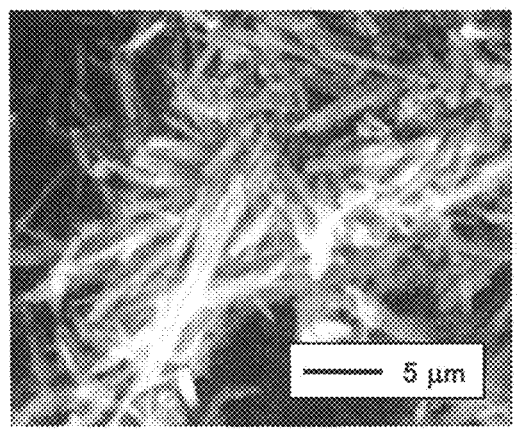
FIG. 6 is a micrograph showing a poly(N-methylcarbazole) columnar structure produced using an N-methylcarbazole 400 mM methanol solution and an iron (III) perchlorate 0.1 M methanol solution in Example 2.

N-methylcarbazole was added to 5 milliliters of methanol to be 50 mM and dissolved in the methanol. Moreover, iron (III) perchlorate was added to 5 milliliters of methanol to be (1) 0.02 M, (2) 0.05 M, (3) 0.2 M and (4) 0.4 M, and dissolved in the methanol. Each of (1) 0.02 M, (2) 0.05 M, (3) 0.2 M and (4) 0.4 M iron(III) perchlorate solutions was added dropwise to an N-methylcarbazole solution at normal temperature (22° C.) over 630 seconds while continuing stirring and bubbling with nitrogen. A dark green precipitate was confirmed in several seconds after starting dropwise addition. After completion of the dropwise addition, the resultant mixture was allowed to stand for 24 hours, and then subjected to suction filtration using a glass filter to obtain the precipitate. A residue was dried at 40° C. for 1 hour using a dryer. SEM micrographs of the poly(N-methylcarbazole) columnar structures obtained are shown in (1) FIG. 3, (2) FIG. 4, (3) FIGS. 5 and (4) FIG. 6, respectively. Average diameters of the poly (N-methylcarbazole) columnar structures obtained from the SEM images were (1) 1,000 nanometers, (2) 700 nanometers, (3) 550 nanometers and (4) 660 nanometers, and average lengths thereof were (1) 25 micrometers, (2) 16 micrometers, (3) 15 micrometers and (4) 16 micrometers, respectively.

Example 3

Figure 7:
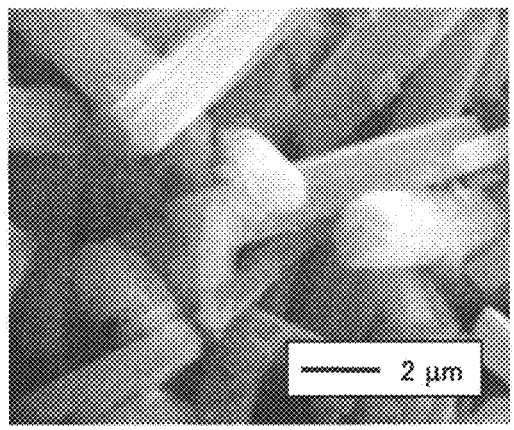
FIG. 7 is a micrograph showing a poly(N-methylcarbazole) columnar structure produced using an N-methylcarbazole 50 mM methanol solution and an iron (III) perchlorate 0.1 M methanol solution under a dropwise addition condition of 0 seconds in Example 3.
Figure 8:
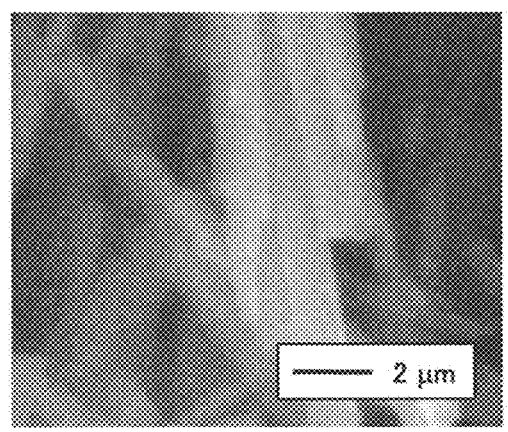
FIG. 8 is a micrograph showing a poly(N-methylcarbazole) columnar structure produced using an N-methylcarbazole 50 mM methanol solution and an iron (III) perchlorate 0.1 M methanol solution under a dropwise addition condition of 100 seconds in Example 3.
Figure 9:
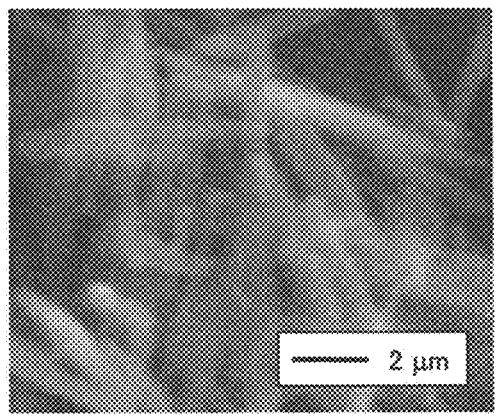
FIG. 9 is a micrograph showing a poly(N-methylcarbazole) columnar structure produced using an N-methylcarbazole 50 mM methanol solution and an iron (III) perchlorate 0.1 M methanol solution under a dropwise addition condition of 420 seconds in Example 3.

N-methylcarbazole was added to 5 milliliters of methanol to be 50 mM and dissolved in the methanol. Moreover, iron (III) perchlorate was added to 5 milliliters of methanol to be 0.1 M and dissolved in the methanol. Bubbling with nitrogen was carried out for 20 minutes while stirring each solution, and then an iron(III) perchlorate 0.1 M methanol solution was added dropwise to an N-methylcarbazole 50 mM methanol solution at normal temperature (22° C.) over (1) 0 seconds, (2) 100 seconds and (3) 420 seconds, respectively, while continuing stirring and bubbling with nitrogen. A dark green precipitate was confirmed in several seconds after starting dropwise addition. After completion of the dropwise addition, the resultant mixture was allowed to stand for 24 hours, and then subjected to suction filtration using a glass filter to obtain the precipitate. A residue was dried at 40° C. for 1 hour using a dryer. SEM micrographs of the poly(N-methylcarbazole) columnar structures obtained are shown in (1) FIG. 7, (2) FIGS. 8 and (3) FIG. 9, respectively. Average diameters of the poly(N-methylcarbazole) columnar structures obtained from the SEM images were (1) 1,600 nanometers, (2) 700 nanometers and (3) 660 nanometers, and average lengths thereof were (1) 26 micrometers, (2) 25 micrometers and (3) 15 micrometers, respectively.

Example 4

Figure 10:
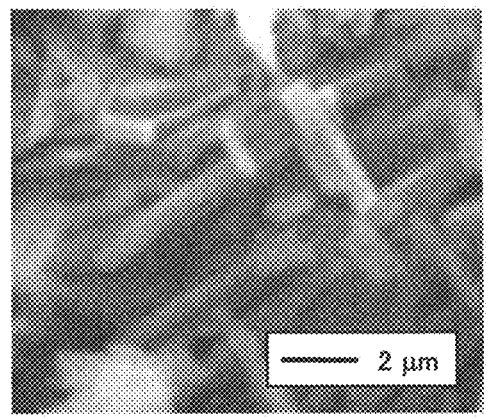
FIG. 10 is a micrograph showing a poly(N-methylcarbazole) columnar structure produced using an N-methylcarbazole 50 mM methanol solution and an iron (III) perchlorate 0.1 M methanol solution under a condition of 0° C. in Example 4.
Figure 11:
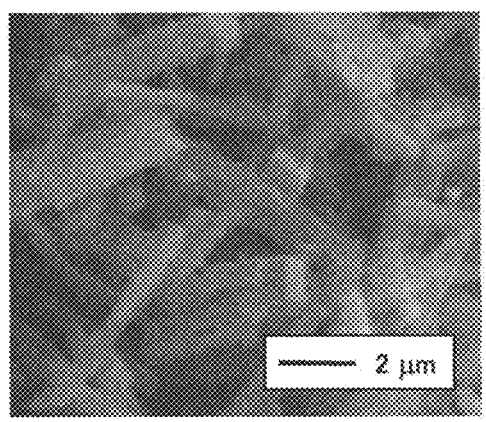
FIG. 11 is a micrograph showing a poly(N-methylcarbazole) columnar structure produced using an N-methylcarbazole 50 mM methanol solution and an iron (III) perchlorate 0.1 M methanol solution under a condition of 60° C. in Example 4.

N-methylcarbazole was added to 5 milliliters of methanol to be 50 mM and dissolved in the methanol. Moreover, iron (III) perchlorate was added to 5 milliliters of methanol to be 0.1 M and dissolved in the methanol. Bubbling with nitrogen was carried out for 20 minutes while stirring each solution, and then an iron(III) perchlorate 0.1 M methanol solution was added dropwise to an N-methylcarbazole 50 mM methanol solution over 630 seconds under temperature conditions of (1) 0° C. and (2) 60° C., respectively, while continuing stirring and bubbling with nitrogen. A dark green precipitate was confirmed in several seconds after starting dropwise addition. After completion of the dropwise addition, the resultant mixture was allowed to stand for 24 hours, and then subjected to suction filtration using a glass filter to obtain the precipitate. A residue was dried at 40° C. for 1 hour using a dryer. SEM micrographs of the residues obtained are shown in (1) FIGS. 10 and (2) FIG. 11, respectively. Average diameters of the poly(N-methylcarbazole) columnar structures obtained from the SEM images were (1) 660 nanometers and (2) 800 nanometers, and average lengths thereof were (1) 8 micrometers and (2) 5 micrometers, respectively.

Example 5

Figure 12:
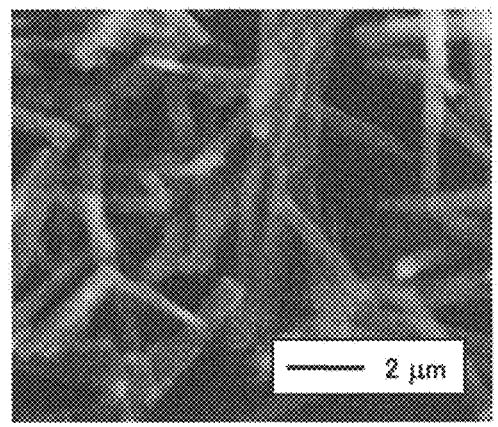
FIG. 12 is a micrograph showing a poly(N-methylcarbazole) columnar structure produced using an N-methylcarbazole 50 mM methanol solution and an iron (III) perchlorate 0.1 M methanol solution under a condition of allowing the resultant mixture to stand for 1 hour after dropwise addition in Example 5.
Figure 13:
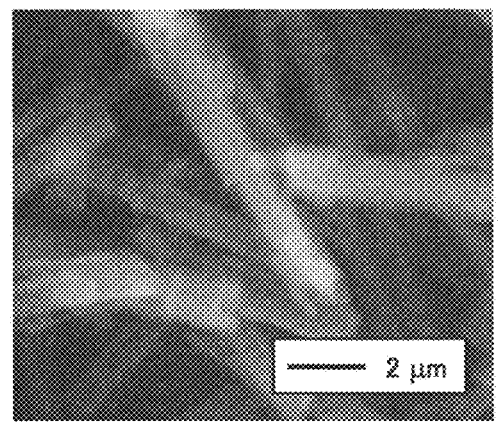
FIG. 13 is a micrograph showing a poly(N-methylcarbazole) columnar structure produced using an N-methylcarbazole 50 mM methanol solution and an iron(III) perchlorate 0.1 M methanol solution under a condition of allowing the resultant mixture to stand for 2 hours after dropwise addition in Example 5.
Figure 14:
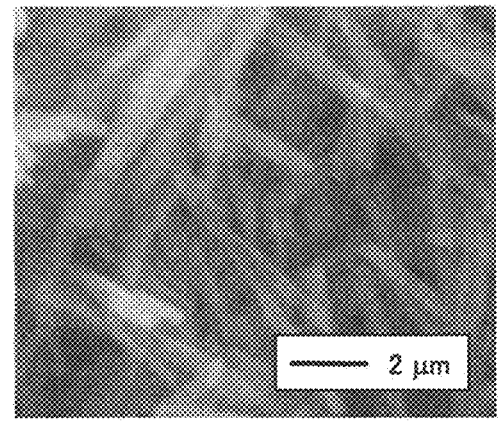
FIG. 14 is a micrograph showing a poly(N-methylcarbazole) columnar structure produced using an N-methylcarbazole 50 mM methanol solution and an iron(III) perchlorate 0.1 M methanol solution under a condition of allowing the resultant mixture to stand for 4 hours after dropwise addition in Example 5.
Figure 15:
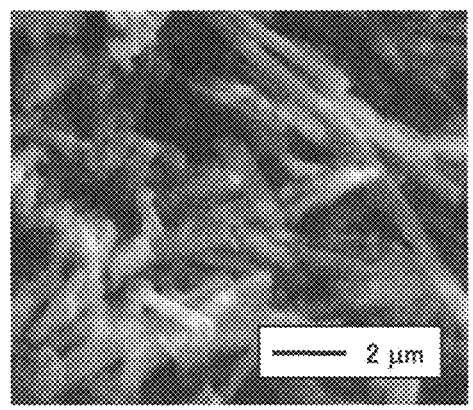
FIG. 15 is a micrograph showing a poly(N-methylcarbazole) columnar structure produced using an N-methylcarbazole 50 mM methanol solution and an iron(III) perchlorate 0.1 M methanol solution under a condition of allowing the resultant mixture to stand for 6 hours after dropwise addition in Example 5.

N-methylcarbazole was added to 5 milliliters of methanol to be 50 mM and dissolved in the methanol. Moreover, iron (III) perchlorate was added to 5 milliliters of methanol to be 0.1 M and dissolved in the methanol. Bubbling with nitrogen was carried out for 20 minutes while stirring each solution, and then an iron(III) perchlorate 0.1 M methanol solution was added dropwise to an N-methylcarbazole 50 mM methanol solution at normal temperature (22° C.) over 630 seconds while continuing stirring and bubbling with nitrogen. A dark green precipitate was confirmed in several seconds after starting dropwise addition. After completion of the dropwise addition, the resultant mixture was allowed to stand for (1) 1 hour, (2) 2 hours, (3) 4 hours and (4) 6 hours, respectively, and then subjected to suction filtration using a glass filter to obtain the precipitate. A residue was dried at 40° C. for 1 hour using a dryer. SEM micrographs of the residues obtained are shown in (1) FIG. 12, (2) FIG. 13, (3) FIG. 14 and (4) FIG. 15, respectively. Average diameters of the poly(N-methylcarbazole) columnar structures obtained from the SEM images were (1) 660 nanometers, (2) 1,000 nanometers, (3) 600 nanometers and (4) 660 nanometers, and average lengths thereof were (1) 10 micrometers, (2) 25 micrometers, (3) 13 micrometers and (4) 8 micrometers, respectively.

Example 6

Figure 16:
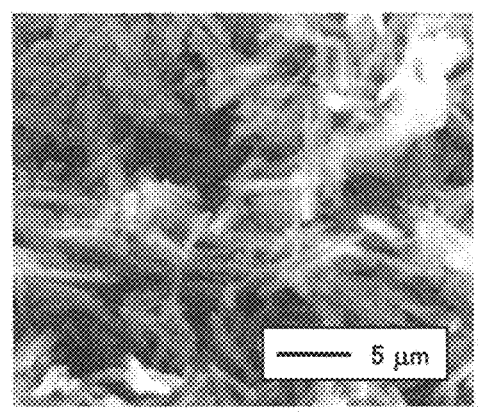
FIG. 16 is a micrograph showing a poly(N-methylcarbazole) columnar structure produced using an N-methylcarbazole 50 mM acetonitrile solution and an iron (III) perchlorate 0.1 M acetonitrile solution in Example 6.

N-methylcarbazole was added to 5 milliliters of acetonitrile to be 50 mM and dissolved in the acetonitrile. Moreover, iron(III) perchlorate was added to 5 milliliters of acetonitrile to be 0.1 M and dissolved in the acetonitrile. Bubbling with nitrogen was carried out for 20 minutes while stirring each solution, and then an iron(III) perchlorate 0.1 M acetonitrile solution was added dropwise to an N-methylcarbazole 50 mM acetonitrile solution at normal temperature (22° C.) over 630 seconds while continuing stirring and bubbling with nitrogen. A dark green precipitate was confirmed in several seconds after starting dropwise addition. After completion of the dropwise addition, the resultant mixture was allowed to stand for 24 hours, and then subjected to suction filtration using a glass filter to obtain the precipitate. A residue was dried at 40° C. for 1 hour using a dryer. A SEM micrograph of the residue obtained is shown in FIG. 16. An average diameter of the poly(N-methylcarbazole) columnar structure obtained from the SEM image was 660 nanometers, and an average length thereof was 22 micrometers.

Example 7

Figure 17:
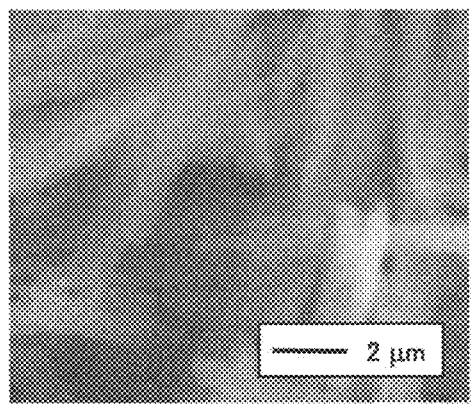
FIG. 17 is a micrograph showing a poly(N-methylcarbazole) columnar structure produced using an N-methylcarbazole 50 mM mixed solution (methanol:acetonitrile=4:1 (volume ratio, hereinafter, a mixing ratio of solvents to be expressed in terms of a volume ratio in a similar manner)), and an iron(III) perchlorate 0.1 M mixed solution (methanol:acetonitrile=4:1) in Example 7.
Figure 18:
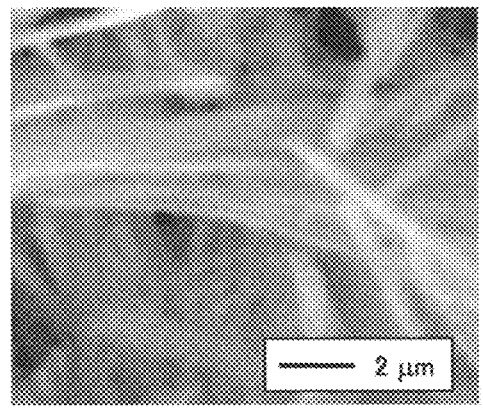
FIG. 18 is a micrograph showing a poly(N-methylcarbazole) columnar structure produced using an N-methylcarbazole 50 mM mixed solution (methanol:acetonitrile=3:1), and an iron(III) perchlorate 0.1 M mixed solution (methanol:acetonitrile=3:1) in Example 7.
Figure 19:
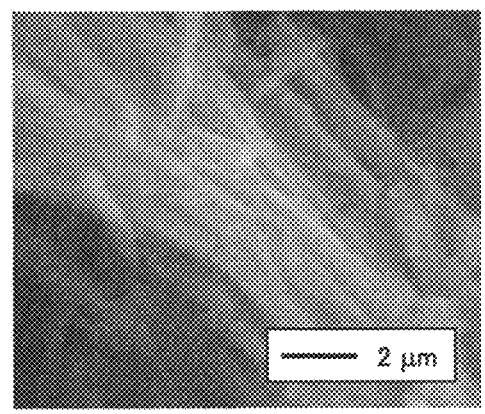
FIG. 19 is a micrograph showing a poly(N-methylcarbazole) columnar structure produced using an N-methylcarbazole 50 mM mixed solution (methanol:acetonitrile=2:1), and an iron(III) perchlorate 0.1 M mixed solution (methanol:acetonitrile=2:1) in Example 7.
Figure 20:
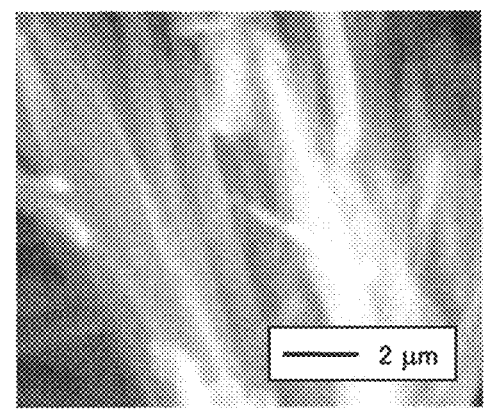
FIG. 20 is a micrograph showing a poly(N-methylcarbazole) columnar structure produced using an N-methylcarbazole 50 mM mixed solution (methanol:acetonitrile=1:1), and an iron(III) perchlorate 0.1 M mixed solution (methanol:acetonitrile=1:1) in Example 7.
Figure 21:
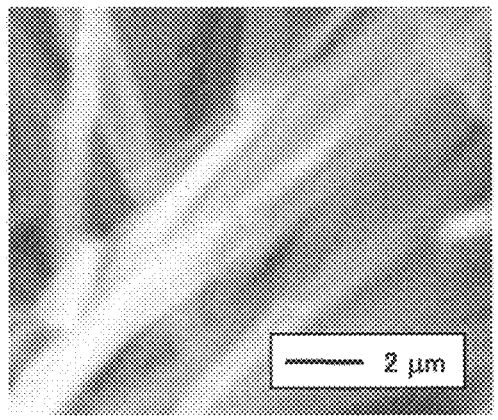
FIG. 21 is a micrograph showing a poly(N-methylcarbazole) columnar structure produced using an N-methylcarbazole 50 mM mixed solution (methanol:acetonitrile=1:2), and an iron(III) perchlorate 0.1 M mixed solution (methanol:acetonitrile=1:2) in Example 7.
Figure 22:
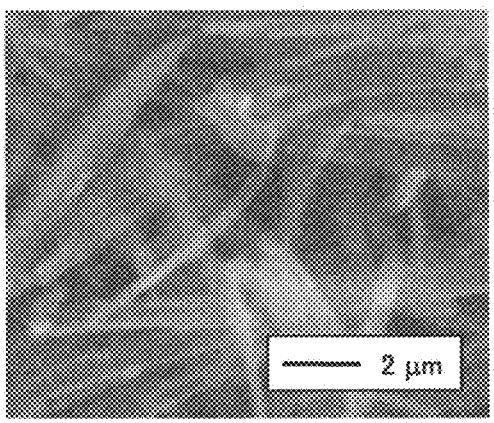
FIG. 22 is a micrograph showing a poly(N-methylcarbazole) columnar structure produced using an N-methylcarbazole 50 mM mixed solution (methanol:acetonitrile=1:3), and an iron(III) perchlorate 0.1 M mixed solution (methanol:acetonitrile=1:3) in Example 7.

As a solvent, a mixed solvent was used in which methanol and acetonitrile were mixed in a volume mixing ratio of (1) 4:1, (2) 3:1, (3) 2:1, (4) 1:1, (5) 1:2 or (6) 1:3. N-methylcarbazole was added to 5 milliliters of each of the mixed solvents to be 50 mM and dissolved in each of the mixed solvent. Moreover, iron(III) perchlorate was added to 5 milliliters of each of the mixed solvents having a ratio of (1) to (6) to be 0.1 M and dissolved in each of the mixed solvents. Bubbling with nitrogen was carried out for 20 minutes while stirring each solution, and then an iron(III) perchlorate 0.1 M mixed solvent solution was added dropwise to an N-methylcarbazole 50 mM mixed solvent solution at normal temperature (22° C.) over 630 seconds while continuing stirring and bubbling with nitrogen. A dark green precipitate was confirmed in several seconds after starting dropwise addition. After completion of the dropwise addition, the resultant mixture was allowed to stand for 24 hours, and then subjected to suction filtration using a glass filter to obtain the precipitate. A residue was dried at 40° C. for 1 hour using a dryer. SEM micrographs of the residues obtained are shown in (1) FIG. 17, (2) FIG. 18, (3) FIG. 19, (4) FIG. 20, (5) FIGS. 21 and (6) FIG. 22, respectively. Average diameters of the poly(N-methylcarbazole) columnar structures obtained from the SEM images were (1) 800 nanometers, (2) 500 nanometers, (3) 800 nanometers, (4) 550 nanometers and (6) 660 nanometers, and average lengths thereof were (1) 30 micrometers, (2) 30 micrometers, (3) 25 micrometers, (4) 30 micrometers, (5) 20 micrometers and (6) 20 micrometers, respectively.

Example 8

Figure 23:
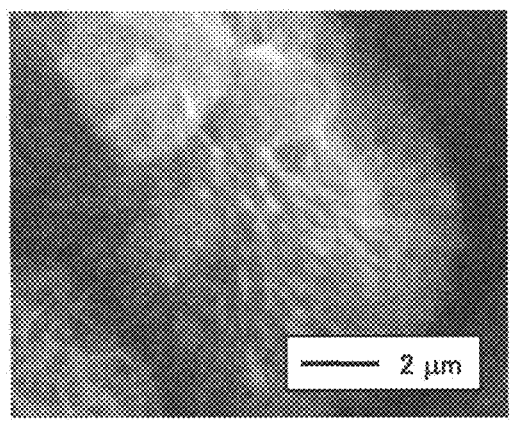
FIG. 23 is a micrograph showing a poly(N-ethylcarbazole) columnar structure produced using an N-ethylcarbazole 50 mM methanol solution and an iron(III) perchlorate 0.1 M methanol solution in Example 8.

N-ethylcarbazole was added to 5 milliliters of methanol to be 50 mM and dissolved in the methanol. Moreover, iron(III)

perchlorate was added to 5 milliliters of methanol to be 0.1 M and dissolved in the methanol. Bubbling with nitrogen was carried out for 20 minutes while stirring each solution, and then an iron(III) perchlorate 0.1 M methanol solution was added dropwise to an N-ethylcarbazole 50 mM methanol solution at normal temperature (22° C.) over 630 seconds while continuing stirring and bubbling with nitrogen. A dark green precipitate was confirmed in several seconds after starting dropwise addition. After completion of the dropwise addition, the resultant mixture was allowed to stand for 24 hours, and then subjected to suction filtration using a glass filter to obtain the precipitate. A residue was dried at 40° C. for 1 hour using a dryer. A SEM micrograph of the residue obtained is shown in FIG. 23. An average diameter of the poly(N-ethylcarbazole) columnar structure obtained from the SEM image was 220 nanometers, and an average length thereof was 8 micrometers.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

INDUSTRIAL APPLICABILITY

A poly(N-alkylcarbazole) columnar structure of the invention is a novel nanosized or microsized material as an electroconductive polymer. The structure of the invention can have an increased surface area because of a nanosized or microsized columnar structure. In particular, a material having a hollow structure can have a significantly increased surface area. Therefore, efficiency of a reaction can be improved. Thus, the material can be applied in various fields, such as (1) an electroconductive material for an electromagnetic wave absorber, (2) a wiring material for a cable, (3) a material for a secondary battery or capacitor, (4) a catalyst, (5) an antibacterial fiber, (6) a probe for a probe microscope and (7) an electron emission source.

While the invention has been described in detail and reference to specific embodiments thereof, it will be apparent to one skilled in the art that various changes and modifications can be made therein without departing from the scope thereof. This application is based on a Japanese patent application filed on Jun. 15, 2011 (Application No. 2011-133060) which is hereby incorporated by reference herein in its entirely.

The invention claimed is:

1. A method for producing a poly(N-alkylcarbazole) columnar structure, comprising a polymerization process for polymerizing N-alkylcarbazole including alkyl having 1 to 4 carbons by adding an oxidizing agent to a solution obtained by dissolving the N-alkylcarbazole in a solvent, wherein the oxidizing agent is added dropwise over 10 seconds or more.

2. The method for producing the poly(N-alkylcarbazole) columnar structure according to claim 1, wherein a dielectric constant of the solvent to be used in the polymerization process is 30 or more.

3. The method for producing the poly(N-alkylcarbazole) columnar structure according to claim 1, wherein the solvent to be used in the polymerization process is methyl alcohol or acetonitrile, or a mixed solvent of methyl alcohol and acetonitrile.

4. The method for producing the poly(N-alkylcarbazole) columnar structure according to claim 1, wherein the oxidizing agent to be added in the polymerization process is iron (III) perchlorate.

5. The method for producing the poly(N-alkylcarbazole) columnar structure according to claim 1, wherein the N-alkylcarbazole is N-methylcarbazole or N-ethylcarbazole.

6. The method for producing the poly(N-alkylcarbazole) columnar structure according to claim 1, wherein the oxidizing agent is added to the solution while bubbling the solution.

* * * * *